United States Patent Office 3,115,467
Patented Dec. 24, 1963

3,115,467
METHOD OF INHIBITING IRRADIATION-INDUCED VISCOSITY INCREASE OF ORGANIC FLUIDS
George H. Denison and Robert O. Bolt, San Rafael, James W. Kent, El Cerrito, Frederick A. Christiansen, Manhattan Beach, and James G. Carroll, El Cerrito, Calif., assignors, by mesne assignments, to the United States of America as represented by the United States Atomic Energy Commission
No Drawing. Filed Sept. 8, 1953, Ser. No. 380,147
4 Claims. (Cl. 252—58)

The present invention relates in general to inhibition of irradiation damage to organic liquids, and more particularly to an improved method for inhibiting neutronic-reactor-irradiation-induced viscosity increase and general deleterious thickening of organic fluids, particularly hydrocarbons, hydrocarbon esters, and saturated poly-ethers, and especially lubricating oils predominantly comprised of the same, and to an improved method for effecting lubrication under neutronic-reactor-irradiation whereby irradiation-induced deterioration of lubricating efficacy is mitigated.

As is known, increasing interest, engineering experimentation and design, and practical application are contemporarily being accorded to the neutronic fission reactor as a radically-advanced source of thermal power. Significantly, in the neutron-induced chain fission reaction accomplished by such reactor, the specific energy content liberated thereby is enormous; the quantity and rate of thermal energy producible, per unit amount of fissionable material consumed, vastly surpass those producible by conventional chemical combustion. For example, in neutron-induced fission of the 235 isotope of uranium, the amount of thermal energy produced per pound of fuel consumed is of the order of two million times that produced by aviation gasoline. Consequently, even in brisk operation as a heat source, a reactor's fuel depletion is comparatively insignificant, such that the initial charge of fuel is ordinarily sufficient to sustain the reaction indefinitely; with such a "furnace," the need for constantly replenishing the fuel is virtually eliminated. Similarly, since the chain fission reaction is inherently capable of operation at intensities on up to those orders manifested by the stellar temperatures attained in atomic bombs, the reactor as a heat source is normally adapted to operation at virtually any desired rate of energy release and temperature level that its structure and materials of construction can withstand. Furthermore, a chain fission reacting system admits of unusual compactness; especially when gross amounts of extraneous materials are excluded from the amassment, an operating reactor core may well be smaller than a few cubic feet in volume. By virtue of these attributes, the neutronic reactor has proven exceptionally promising for use as the ultimate heat source for power plants, particularly for stationary electric generating plants, and for mobile propulsive power plants for ships and aircraft; of especial significance in mobile applications, where the afforded elimination of the need for any substantial amount of replacement fuel renders insignificant the formerly-limiting fuel capacity consideration, practical limitless range of such craft may be realized.

The fundamental theory, details of construction, and principles of operation, of neutronic reactors are now widely known in the art. For such details, specific reference is made to published papers, as for example:

"The Science and Engineering of Nuclear Power," vols. 1 and 2, edited by Clark Goodman, Addison-Wesley, 1947–1949;

"Elementary Pile Theory," Soodak and Campbell, 1950, Wiley;

"First Detailed Description of the AEC Research Reactors," Atomics, vol. 6, No. 6, November-December 1950, pages 4–22;

and co-pending applications of the common assignee, as:

S.N. 568,904, filed December 19, 1944, in the names of E. Fermi and L. Szilard, for Chain Reactions, now Patent No. 2,708,656, dated May 17, 1955;

S.N. 321,078, filed November 18, 1952, now Patent No. 2,945,794, in the names of Charles E. Winters et al., for Improved Neutronic Reactor Operational Method and Core System; and S.N. 314,595, filed October 14, 1952, now Patent No. 2,831,806, in the name of Eugene P. Wigner, for High Flux Experimental Pile.

In simplest contemplation, the essence of a neutronic reactor is an amassment of fissionable material in sufficient quantity to self-sustain a chain fission reaction therein. That is, in the fission reaction, an atomic nucleus of a fissionable material—prominent among which are the isotopes uranium-235, plutonium-239, uranium-233, and others—absorbs a neutron of indiscriminate energy and thereupon splits into a plurality of fragments of greater mass than an alpha particle, which splitting is accompanied not only by the release of a relatively enormous amount of energy, but also by the release of a plurality of fresh neutrons. By virtue of the fission reaction's generating more new neutrons than it consumes, it is possible, by amassing sufficient fissionable material under appropriate conditions, to form an aggregate system capable of generating new fission-inducing neutrons at a rate equal to or greater than that at which they are being lost to the system as a result of absorption in the system or leakage from the system, and consequently capable of maintaining a self-sustaining neutron induced chain fission reaction. As further refinements, since the propensity of fissionable isotopes for absorption of neutrons leading to fission prominently increases with decrease in kinetic energy of the neutrons, it is customary, in most circumstances, to incorporate in the amassment, in more or less intimate admixture with the fissionable material, another material effective in decelerating neutrons upon their encountering same; such material, for example, water, heavy water, graphite, beryllium, or the like, is termed a "neutron-moderant." To remove heat generated, a stream of heat-transfer fluid is generally circulated through the amassment, and to control the rate of fission reaction, a system of adjustably insertable masses of a strong neutron absorber, such as boron or cadmium, which will, when inserted, serve to fruitlessly dissipate neutrons, is normally provided. A typical reactor, for example, is constituted of a cubical core of graphite ca. 20 feet in each principal dimension, built up of stacked graphite bars, having a multiplicity of parallel horizontal channels passing completely therethrough, and having a multiplicity of masses of natural uranium metal disposed within such channels. The atomic ratio of carbon to uranium in the cube is of the order of 200, such that the average neutron energy in the system closely approaches that of the normal thermal energy of neutrons at the ambient temperature, i.e. ca. 0.025 electron volt at room temperature. The cube has adjustably inserted therein a plurality of control rods, comprising a strong neutron absorber whereby the fission rate may be appropriately regulated by adjustment of the extent of the rods withdrawal from the cube. Air, or other coolant, is continuously blown or drawn through the aforesaid channels, which are only partially occupied by the masses of uranium, to remove the heat generated within the cube.

Characteristically, operation of a reactor is attended by the continuous emanation, in all directions therefrom, of radiation of various types—principally neutrons, gamma rays, and alpha and beta particles—of energies ranging to exceedingly great intensities and in quantities so immense as to fall in a realm wholly different from any experienced prior to the advent of the reactor. Among these, neutrons and gamma rays are, by far, of the greater consequence; while the alpha and beta radiation, being charged particles, are mostly stopped upon encountering merely a few millimeters of any intervening solid material, the neutrons and gammas are exceedingly more penetrating, and thus generally bombard and permeate all unshielded surrounding environment of the reactor. Representative of the spectrum of neutron and gamma radiation ordinarily emanated from such as the typical reactor alluded to hereinabove are the data presented in Table I following.

TABLE I

*Typical Neutron and Gamma Radiation Spectrum Emanated From Operating Neutronic Reactor [1] (Approximate)*

| Neutrons | | Gamma Rays | |
|---|---|---|---|
| Total Flux=ca. $1 \times 10^{10}$ neutrons/cm.$^2$/sec., ca. 5,000 Roentgens/hr. | | | |
| Energy Range | Percentage of Neutrons | Energy Range | Percentage of Photons |
| 8 to 0.5 Mev.[2] | 10 | ca. 8 Mev | 20 |
| 0.5 Mev. to 0.025 ev | 90 | ca. 3-2 Mev | 30 |
| | | ca. 1 Mev | 50 |

[1] For bare thermal reactor; graphite moderated; air cooled.
[2] Million electron volts.

For reactors operating at higher generated power densities, especially the more compact mobile reactors designed for aircraft and ship propulsion, the levels of total flux emanated tend to range from 1 to 3 orders of magnitude higher than those outlined in Table I, although the relative distribution of radiation throughout the spectrum is usually not greatly different; the levels of flux within the hearts of the reactor cores themselves tend to be another one or two orders of magnitude greater than those indicated to be emanated from the surface.

More particularly concerning the present invention, the derivation of useful nuclear power will often require the use, in such intensely radioactive environment of a reactor, of fluid organic compounds for functions dependent primarily upon fluidity. Such materials include especially lubricants, as well as power transmission fluids, heat transfer fluids, and the like. For example, in designs for aircraft propulsion application, where a reactor is simply substituted, in place of fuel combustion units, to serve to heat the air in an enlarged version of a conventional turbo-jet engine, the main bearings of the compressor-turbine rotor and their lubricant may be located within a foot or so of the reactor core, and in such position are exposed to the full fury of the virtually unimpeded radiations emanated from the reactor core. Likewise, in other mobile and stationary applications wherein, for extracting the generated heat from the reactor, a stream of liquid coolant, such as water, aqueous solutions, molten metals, molten salts, and the like, is flowed in heat-transfer relationship therethrough, the liquid-circulating pumps, their bearings, and their lubricants, are similarly disposed in close proximity to the reactor core, and thus sustain intense bombardment by radiation therefrom. In the same manner, power transmission fluids, heat transfer fluids, lubricants for control rod drive motors and linkages integrally associated with the reactor core, all disposed within or in close proximity to the reactor core, and lubricants for bearings and moving parts of somewhat more remote entities of nuclear power production plants, are similarly subjected, to greater or lesser degrees, to irradiation by the reactor.

However, it has become apparent that, as a general rule, nuclear reactor irradiation deleteriously reduces the fluidity of organic compounds, often to the extent of complete solidification in a very short time. This is notable in the case of liquid hydrocarbons and hydrocarbon esters, which include, to a large measure, the wide variety of liquids normally adapted to serve as efficacious lubricants and other such functional liquids in non-radioactive environments. For example, a representative, conventional, commercial, petroleum, hydrocarbon, lubricating oil—i.e., paraffinic, solvent-refined, Western (United States) automotive oil SAE–30—upon irradiation for four weeks in a reactor much the same as that outlined as a typical reactor hereinabove, thickened from its original viscosity range of medium-weight automotive oil to virtually a solid. In that instance the approximated cumulative radiation dosage sustained amounted to ca. $1.7 \times 10^{18}$ neutrons per square centimeter and a proportionate dosage of gamma radiation; significantly, this represents approximately the same accumulated radiation dosage, and thus expectably much the same radiation damage to the lubricant, that would be sustained in a typical design of aircraft-propulsion reactor, operating at a radiation flux intensity level about 2 orders of magnitude greater, in so short a time as only 6 to 7 hours. (For matter of definition, the approximated quantitative value of cumulative neutron dosage, as set forth immediately above and at other points hereinafter throughout the specification, refers to the computed product of the measured neutron flux into which the sample is inserted in units of neutrons/square centimeter/second and the measured duration of time, in units of seconds, throughout which the sample remained so inserted. Although it is true that the very presence in the neutron flux of the sample itself, which is not totally transparent to neutrons but effects some absorption thereof, results in the total flux at the location of the sample being lower in the presence than in the absence of the sample, nevertheless with the small volumes of samples employed and the very low neutron absorptivity of carbon, hydrogen, and oxygen atoms, as well as of the aluminum and quartz containers employed, in the present case, the computed product approaches quite closely the actual dosage sustained by any given square centimeter area within the sample.) Moreover, upon a somewhat longer irradiation of five weeks (cumulative dosage=$1.94 \times 10^{18}$ neutrons per square centimeter), the same SAE–30 oil became altogether solid. Similarly, another liquid hydrocarbon appropriate for service as a lubricating oil, of so low a viscosity as a very light textile spindle or instrument oil—i.e., a technical mixture of alkylbenzene of molecular weight approximating 250 (derived commercially as by-product high-molecular-weight bottoms from detergent alkylbenzene manufacture)—when subjected to such a ca. 4 week irradiation, thickened to the range of turbine oil. Likewise, in the case of organic esters, it was found that a representative ester—viz., di(2-ethyl-hexyl) sebacate—upon a similar 4 week irradiation, thickened from the range of textile spindle oil to a solid. Moreover, even in the case of saturated poly-ethers—which four of the instant applicants have contemporaneously discovered to exhibit remarkable, superior characteristics of radiation resistance, and to which their companion patent application S.N. 380,145, in the names of G. H. Denison, R. O. Bolt, J. W. Kent and F. A. Christiansen, filed September 8, 1953, now abandoned, for Method of Resisting Irradiation Induced Viscosity Increase of Organic Fluids is directed—it was found that an exemplary species, polymerized propene-oxide, of initial viscosity of the range of light automotive oil, thickened, upon the 4 week irradiation, to the range of heavy-grade summer-weight automotive and railway car oil.

Furthermore, this difficulty was found to compound itself in cases where conventional additive agents were incorporated in these base oils. For instance, the organic amines are known in the art to constitute a particularly-effective type of conventional additive to improve the properties—especially thermal oxidation resistance—of lubricating oils. Phenyl-$\alpha$-naphthylamine, N-phenyl-4-hydroxyphenylamine, and N-N'-diphenyl-p-phenylenediamine are representative species employed in practice. However, when utilized under the subject reactor irradiation, the incorporation of these amines proved, quite adversely, to accelerate and increase radically the resultant viscosity increase upon irradiation. For example, when conventional amounts—1% to 2% by volume—of each of these amine species were separately incorporated in the polymerized propene-oxide base oil, of viscosity originally approximating light automotive oil, the resulting oils were found to thicken so rapidly as to the consistency of steam cylinder and valve oil upon only 2 weeks' irradiation, and to complete solidification upon 4 weeks' irradiation.

Such inordinate thickening under reactor irradiation has imposed a serious obstacle to the successful design of nuclear power plants. Under the circumstances, this effect tends to necessitate resort to constant disposal and replacement of thickened radiation-exposed fluids with a continual supply of fresh fluids so as to sustain the functions of the fluids. That such procedure in any event represents costly extravagance is obvious, and in cases of mobile nuclear power plants for the propulsion of aircraft, the ponderousness and bulk of the quantities of such expendable fresh fluids needed for the desired long-rang operations, and of extra radiation shielding to protect the same from progressive radiation damage even before used, would seriously detract from the general performance, and indeed would ofttimes be practically preclusive even of take-off, of the resultingly overburdened aircraft. Consequently, there has been an increasing desire that new, effective means be found toward mitigating and overcoming this radiation-thickening difficulty, and thus affording more practical application of such organic liquids for functional purposes where exposed to the irradiation of operating neutronic reactors.

Accordingly, one object of the present invention is to provide a new and improved method for inhibiting neutronic-reactor-irradiation-induced viscosity increase in fluid organic hydrocarbons, hydrocarbon esters, and saturated poly-ethers.

Another object is to provide such a method which is simply effectible by means of incorporation of an additive agent in the organic fluid.

A further object is to provide such a method for affording full effectiveness upon the use of merely a quite minor proportion of the additive agent, and which otherwise does not materially alter the functional efficacy of the organic fluid treated.

Still another object is to provide such a method especially applicable where the organic fluid is specifically a lubricating oil.

Still a further object is to provide a new and improved method for the lubrication of a system with a lubricant being subjected therein to neutronic reactor irradiation deleterious to its lubricating efficacy.

Additional objects will become apparent hereinafter.

In accordance with the present invention, neutronic-reactor-irradiation-induced viscosity increase in an organic fluid, particularly one selected from the group which consists of hydrocarbons, hydrocarbon esters, and saturated poly-ethers, is inhibited by a method which comprises including in said fluid an agent selected from the group consisting of halogens and organic halogen compounds. Applicants have discovered that upon incorporating a minor volumetric proportion—ordinarily as little as only a few percent—of a halogen or an organic halogen compound in a liquid organic hydrocarbon, hydrocarbon ester, or saturated poly-ether, the degree of irradiation-induced viscosity increase resulting from exposure to a given dosage of neutronic reactor radiation is markedly reduced, the rate of progressive thickening under a given intensity of continuous reactor irradiation is substantially decreased and inhibited, and otherwise a pronounced relative resistance to reactor irradiation damage is imparted to the fluid. For example, it was found that upon saturating, with iodine, fresh quantities of the technical alkylbenzene mixture of molecular weight approximating 250 alluded to hereinabove, and subjecting the same to much the same intensities of neutronic reactor irradiation as mentioned before, the iodine-saturated oil, in 5 weeks' irradiation, thickened of the order of 30 to 50% less—remaining in range of textile spindle oil—than did the uninhibited oil in only 4 weeks' irradiation. Likewise, the sebacate ester, upon incorporation of 5% iodobenzene therein, thickened, after 4 weeks' irradiation, merely to the range of turbine oil, rather than solidifying. Similarly, with 2% iodobenzene incorporated, the polymerized propene-oxide thickened only to the range of medium automotive oil (as compared with irradiation-thickening, in the absence of iodobenzene, all the way to heavy-grade summer-weight automotive and railway car oil). Furthermore, the presence of such a modicum of added halogen-agent was further found not to detract materially from the lubricating efficacy of the oils to which they were added, such that application of such halogen-agent-inhibit hydrocarbon, hydrocarbon ester, and saturated poly-ether lubricants comprises, in accordance with the present invention, an improved method for the lubrication of a system with a lubricant being subjected therein to deleterious reactor irradiation. Being of such efficacy, and having such beneficial attributes, the present method clearly affords substantial practical advantages in the application of functional fluids in nuclear power plants.

Considering the operation of the instant process more particularly, the particular species of organic halogen compounds, along with the elemental halogens, suitable for such inhibition service are, in accordance with the present invention, subject to wide variation. Organic compounds, both aromatic and aliphatic, containing halogen atoms in their molecules are suitable, with those molecules containing no atoms other than carbon and hydrogen, in addition to the halogen atoms, being preferred. Notably effective are the simple halo-benzenes, as are other simple aromatic ring systems having a halogen atom substituted therein. Inhibition efficiency has been observed to increase in proceeding down the halogen series from the fluorine atom, through chlorine and bromine, to the iodine; consequently, among the several halogens, iodine and iodo-organic compounds are especially beneficial. Eminent inhibition efficacy, and appropriate solubility in hydrocarbon, ester, and poly-ether systems normally encountered, make the following representative halogen-agents the particular preferred species:

| | |
|---|---|
| Iodine | Bromobenzene |
| Iodobenzene | Bromoform |
| Iodonaphthalene | Dichlorobiphenyl |
| Iodobiphenyl | 4-fluoroanisole |
| Diiodomethane | |

The types of fluid organic hydrocarbons, hydrocarbon esters, and saturated poly-ethers encountered in practice to which such halogen-agent inhibitors are to be added, in accordance with the present invention, are similarly subject to considerable variation. Among hydrocarbons, most common are simply petroleum cuts of suitable viscosity ranges for the desired services. Representative of the better of these are the commercial paraffinic solvent-refined lubricating oils derived from Western (United States) petroleum, and also from Pennsylvania, Middle East, Mid-Continent (United States), and Coastal (United States) petroleum crudes, and of the various common viscosities ranging from light textile spindle and turbine oils, on including automotive oils, and on through heavy steam cylinder, gear, and chain oils. Too, the liquid hydrocarbons, derived from sources other than petroleum and having beneficial viscosities within much the same ranges, are also frequently encountered, as for example technical alkyl-benzene mixtures of molecular weight approximating 250 to 350, derived as by-product high-molecular-weight-bottoms in commercial detergent alkylbenzene manufacture. Also, liquid single individual organic compounds, especially long-chain paraffins and long-chain-paraffin-substituted aromatic compounds, of similar appropriate viscosities, as exemplified by hexadecane (i.e., cetane), and octadecylbenzene, are also appropriate. Among the esters, different species affording appropriate viscosity, heat resistance qualities, and the like, and thus adapted to functional service, are likewise varied. Prominent, though, are those derived from dicarboxylic acids both aromatic and aliphatic, in conjunction with aliphatic, or, better, straight-chain saturated aliphatic, alcohols, and especially from those acids and alcohols of such types respectively comprising from about six to twelve carbon atoms in their molecules. Such compounds provide a liberal assortment of different viscosities and other functional properties; representative of these are: di(2-ethyl hexyl) sebacate i.e.,

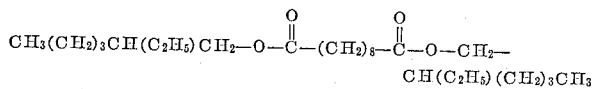

approximating the consistency of light turbine oil and instrument oil; didecyl terephthalate, i.e.,

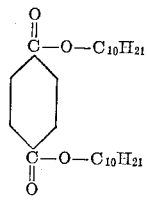

approximating the consistency of automotive oil; and di(2-ethyl hexyl) orthophthalate, i.e.,

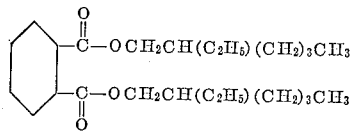

di(2-ethyl hexyl) adipate, i.e.,

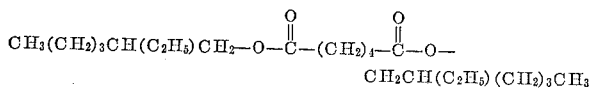

and diethyl adipate, i.e.,

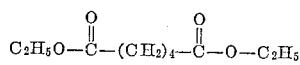

which approximate the consistency of light textile spindle, and very light instrument, oils. Saturated poly-ethers appropriate for present service as superior radiation-thickening-resistant fluids, in accordance with applicants' companion patent application S.N. 380,145, now abandoned, identified supra, should contain at least two ether linkages in their molecules, and are perferred to be constituted of a multiplicity of ether linkages spaced between short, saturated, and preferably straight-chain aliphatic radicals. Furthermore the poly-ether should, of course, have a viscosity appropriate for the particular service to which it is to be applied. For services calling for quite low viscosities, such as lubrication of instruments, individual polyether compounds of definite composition are available and readily applicable; representative of these is the dimethyl ether of tetraethylene glycol:

$$(CH_3OC_2H_4OC_2H_4OC_2H_4OC_2H_4OCH_3)$$

which approximates the viscosity of light instrument oil. For services requiring higher viscosities, where individual compounds of unform definite molecular constitution become more complex and unwieldy, both in molecular structure and in preparation, polymerized alkene-oxides have proven to be eminently suited, especially polymerized propene-oxide. Such alkene oxides may be polymerized by various methods known in the art; one of the most common and well developed method comprises the reaction of an alkene oxide, such as 1,2-propene oxide, with an aliphatic monohydric alcohol, wherein the alkene-oxide molecules undergo conversion to the corresponding oxy-alkene radicals, which are thereupon regarded to link end-to-end to form long polymeric molecules, which molecules are ultimately terminated at one extremity by the aliphatic radical of the alcohol employed, and at the other extremity by a hydroxyl group. In some instances the art has found it preferable to resort to an ester, rather than an alcohol, as the agent for promoting polymerization. The reaction products are fundamentally mixtures of poly-ether molecules of different sizes, and are available in the art in different degrees of polymerization, largely ranging from fluids having an average molecular weight of 400 to fluids having an average molecular weight as high as 3,000, with corresponding viscosities ranging from those of light instrument, textile spindle, and turbine oils on up through the automotive oil range, to virtual solids. In the case of propene oxide, the polymer has the fundamental structure:

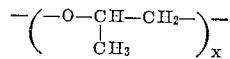

The presence of other additives incorporated in the hydrocarbon, ester, and poly-ether base oils, unless they adversely engage in interaction with the halogen or organic halogen compounds employed, are normally unobjectionable; these, added to enhance the oils in their own various specific manners, consequently tend to complement the added halogen-agent in enhancing the overall efficacy of the resulting compounded oil. For example, it is often desirable to incorporate—in accordance with another contemporaneous invention of the present applicants, to which their companion application S.N. 380,144, filed September 8, 1953, for Method of Inhibiting Irradiation Damage to Organic Fluids, is directed—a small amount of an organic selenide, toward substantially inhibiting the reactor-irradiation-induced viscosity increase and thus complementing the action of the instant halogen or organic halogen compounds; this is particularly applicable in the cases of hydrocarbons and esters, as well as in the case of the tetraglycol, and the like. Also, it may sometimes be desirable to incorporate in the base oil quantities of aromatics; representative of such an additive is 1-methyl-naphthalene, ordinarily incorporated in only minor proportion. Especially in the presence of base metals, e.g., iron and copper, say those constituting the container, mechanical members, bearings, and the like, in contact with the oil, the addition of small amounts of alizarin or other hydroxyl-substituted anthraquinone, for example quinizarin, may likewise be desirable toward inhibiting adverse thickening of the oil upon irradiation.

Of particular interest in connection with the presence of other additives is the case where such conventional additives as organic amines may be encountered. As outlined hereinabove, it has been found, for example, that incorporation into the polymerized propene-oxide base oil of such conventional additives as organic amines radically accelerates and increases the deleterious thickening of the oil sustained upon reactor irradiation. However, applicants have further found that even in so formidable a situation, the further incorporation of their halogen-agents into the amine-containing base oil affords substantial inhibition of the extent of the amine-accelerated irradiation thickening. This, in effect constituting mitigation of an organic-amine-catalyzed irradiation thickening susceptibility, represents a further beneficial accomplishment of the present invention.

In conducting the present method, the halogen-agent is simply added to, intimately admixed with, and dissolved into, the liquid hydrocarbon, hydrocarbon ester, or saturated polyether; thereupon, the resulting system, in its consequent state of markedly-enhanced reactor-irradiation-damage resistance, is applied to serve in lubrication, or other desired function, under subjection to deleterious irradiation. With respect to the amount of halogen or organic halogen compound to be added, it may initially be said that any amount, however small, will have some beneficial radiation-damage-inhibition effect. However, based upon empirical investigation, the maximum degree of inhibition to be afforded by such organic halogen compounds seems largely approached, at least in the case of the sebacate ester, upon the incorporation of an amount of organic halogen compound approximating 8% of the initial volume of the ester base oil. Increasing the amount of added organic halogen compound all the way to 16% accomplishes less inhibition than at 8%. Below 8%, the degree of inhibition appears to decrease monotonically with decrease in the proportional amount of additive employed, but still is noticeably effective at 0.5%. Significantly, though, the effectiveness at 2% to 5% does not fall far behind that of 8%. Furthermore, superimposed is the consideration that undue excesses of the additive should best be avoided, toward minimizing the extent of alteration of the composition of the original fluid and concomitantly its functional properties. Accordingly, in practice, 2 to 5 volumetric percent appears to represent the practical and economic optimum.

Further illustration of the quantitative aspects and preferred conditions and procedures of the present method is provided in the following specific examples. In Example I, the effect of reactor irradiation upon the viscosity of various organic liquids containing halogen and organic halogen compounds as additives in accordance with the present invention is assessed and compared with the effect upon the same and other organic liquids having no halogen agent incorporated therein.

EXAMPLE I

A series of samples of liquid hydrocarbons, hydrocarbon esters, and saturated poly-ethers of different exemplary types, and of different viscosities representative of ranges generally useful for applications in nuclear power plants, were assembled. The samples of each species of fluid were divided into a number of smaller quantities, into some of which were incorporated amounts of a halogen or one of several preferred, representative organic halogen compounds, in appropriate proportions in accordance with the present invention, while other portions were retained free of halogen-agent for purpose of comparison. Into some were incorporated minor proportions of other additive agents, as indicated, also. The quantities so prepared were divided into still smaller portions. One portion of each was retained in original condition for viscosity measurement. Other of the portions so obtained were introduced, in substantial identical quantity (ca. 7 milliliters), into respective small transparent fused quartz ampoules, of ca. 14 to 17 milliliters' internal volume, having a wall thickness of approximately one millimeter, and provided in the top with a ca. 5 millimeters' diameter vent hole. Each ampoule was disposed vertically in a vertical right cylindrical 2S aluminum can, 0.75 inch internal diameter x 2.875 inches internal height, of 0.035 inch wall thickness, completely closed except for a Number 50 drill hole in its top. The ampoule-containing cans were thereupon inserted and disposed directly wtihin the core of an operating thermal neutronic reactor similar to that alluded to as a typical reactor in connection with Table I supra, in positions wherein the radiation flux intensity approximated $0.5 \times 10^{12}$ to $1 \times 10^{12}$ neutrons per square centimeter per second, and $2 \times 10^5$ to $5 \times 10^5$ roentgens/hr. in gamma radiation; the drill holes in the tops of the cans were exposed in direct communication with the streams of air being drawn through the reactor as coolant. The samples were maintained within the operating reactor for differing periods of duration ranging mostly from 1 to 4 weeks, and, throughout the irradiation, different groups of samples were retained at different temperature levels representative of those to which the samples would be subjected in functional applications. Upon removal from the reactor, the viscosity of each of the portions was determined both at a 100° F. and at 210° F.; similar viscosity measurements were made upon retained portions of the samples in original, unirradiated state. The data obtained, including neutron dosage sustained by each portion at its particular location within the reactor, as a convenient indication of the extent total dosage of all species of radiation sustained, are presented in comparative fashion in Table II below.

TABLE II

*Effect of Neutronic Reactor Irradiation Upon Viscosity of Organic Fluids*

| Identity—Additive | $\Theta_1{}^a$ (Weeks) | $\Theta_2{}^b$ (hrs.) | Neutron[c] Dosage $\times 10^{-18}$ (n/cm.²) | Temp. (ave.) (° C.) | Viscosity (centistokes) | | | |
|---|---|---|---|---|---|---|---|---|
| | | | | | at 100° F. | | at 210° F. | |
| | | | | | Orig. | Irrad. | Orig. | Irrad. |
| Typical Damage to Lubricating Oil: | | | | | | | | |
| Paraffinic Solvent Refined Western (U.S.) Lubricating Oil (SAE-30). | 1 | ½ | 0.15 | 46 | 118 | 160 | 11.5 | 13.8 |
| | 1 | 2 | 0.45 | 20 | 118 | 220 | 11.3 | 17.4 |
| | 1 | 2 | 0.44 | 80 | 117 | 251 | 11.4 | 19.1 |
| | 2 | 2½ | 0.59 | 73 | 117 | 477 | 11.4 | 29.2 |
| | 4 | 3 | 0.76 | 46 | 118 | broken | 11.3 | broken |
| | 2 | 4 | 0.94 | 78 | 124 | 1312 | 11.5 | 48.0 |
| | 2 | 4 | 0.94 | 78 | 124 | 1300 | 11.7 | 43.4 |
| | 4 | 4½ | 1.14 | 80 | 117 | 1355 | 11.4 | 60.0 |
| | 4 | 7 | 1.70 | 20 | 118 | too viscous | 11.3 | too viscous |
| | 5 | 8 | 1.94 | 67 | 117 | solid | 11.4 | solid |
| Esters: | | | | | | | | |
| Di(2-ethyl hexyl) sebacate | 1 | 1½ | 0.33 | 66 | 12.9 | 25.8 | 3.4 | 5.4 |
| | 1 | 1½ | 0.40 | 66 | 13.1 | 31.4 | 3.4 | 6.1 |
| | 2 | 3½ | 0.84 | 66 | 12.8 | 132.8 | 3.4 | 17.6 |
| | 2 | 3½ | 0.84 | 67 | 12.8 | 237.8 | 3.4 | 22.6 |
| | 4 | 5½ | 1.35 | 65 | 12.9 | 438 | 3.4 | 46.0 |
| | 4 | 6 | 1.53 | 66 | 13.1 | solid | 3.4 | solid |
| Di(2-ethyl hexyl) sebacate+0.5% Iodobenzene. | 1 | 1½ | 0.40 | 122 | 12.2 | 30.9 | 3.1 | 6.1 |
| | 4 | 6 | 1.52 | 104 | 12.3 | solid | 3.4 | solid |
| Di(2-ethyl hexyl) sebacate+1% Iodobenzene | 1 | 1½ | 0.40 | 121 | 12.5 | 24.5 | 3.4 | 5.1 |
| | 4 | 6 | 1.48 | 98 | 12.5 | 1,459.5 | 3.4 | 126.4 |

See footnotes at end of table.

TABLE II—Continued

| Identity—Additive | Θ₁[a] (Weeks) | Θ₂[b] (hrs.) | Neutron[c] Dosage ×10⁻¹⁸ (n/cm.²) | Temp. (ave.) (°C.) | Viscosity (centistokes) at 100° F. Orig. | Viscosity (centistokes) at 100° F. Irrad. | Viscosity (centistokes) at 210° F. Orig. | Viscosity (centistokes) at 210° F. Irrad. |
|---|---|---|---|---|---|---|---|---|
| Di(2-ethyl hexyl) sebacate+2% Iodobenzene | 1 | 1½ | 0.33 | 63 | 12.1 | 13.6 | 3.3 | 3.4 |
|  | 1 | 1½ | 0.33 | 58 | 12.2 | 19.0 | 3.3 | 4.3 |
|  | 1 | 1½ | 0.34 | 67 | 12.4 | 16.2 | 3.3 | 3.9 |
|  | 4 | 4½ | 1.18 | 67 | 12.4 | 49.0 | 3.3 | 9.4 |
|  | 4 | 6 | 1.52 | 106 | 12.2 | 1,745 | 3.3 | 147.3 |
|  | 4 | 6½ | 1.63 | 78 | 12.1 | 177.1 | 3.4 | 21.2 |
| Di(2-ethyl hexyl) sebacate+4% Iodobenzene | 1 | 1½ | 0.40 | 122 | 11.8 | 20.0 | 3.2 | 4.5 |
|  | 4 | 6 | 1.48 | 101 | 11.7 | 327.7 | 3.2 | 34.1 |
| Di(2-ethyl hexyl) sebacate+5% Iodobenzene | 1 | 1½ | 0.32 | 63 | 11.3 | 14.8 | 3.1 | 3.6 |
|  | 4 | 4½ | 1.12 | 65 | 11.3 | 31.1 | 3.1 | 5.9 |
| Di(2-ethyl hexyl) sebacate+8% Iodobenzene | 1 | 1½ | 0.34 | 68 | 10.9 | 14.3 | 3.0 | 3.5 |
|  | 4 | 4½ | 1.18 | 68 | 10.9 | 25.8 | 3.0 | 5.2 |
| Di(2-ethyl hexyl) sebacate+15% Iodobenzene | 1 | 1½ | 0.36 | 68 | 9.1 | 23.5 | 2.7 | 3.5 |
|  | 4 | 6 | 1.45 | 69 | 9.2 | 47.1 | 2.7 | 7.8 |
| Di(2-ethyl hexyl) sebacate+5% Iodonaphthalene. | 1 | 1½ | 0.36 | 67 | 12.2 | 19.3 | 3.2 | 4.7 |
|  | 4 | 6 | 1.45 | 69 | 12.2 | 46.5 | 3.2 | 7.7 |
| Di(2-ethylhexyl) sebacate+5% Iodobiphenyl | 1 | 1½ | 0.32 | 65 | 12.3 | 15.0 | 3.2 | 3.6 |
|  | 4 | 4½ | 1.12 | 65 | 12.3 | 31.2 | 3.2 | 5.8 |
| Di(2-ethyl hexyl) sebacate + 5% Diiodomethane. | 1 | 1½ | 0.33 | 66 | 11.8 | 15.3 | 3.2 | 3.7 |
|  | 4 | 4½ | 1.14 | 66 | 11.8 | 29.4 | 3.2 | 5.7 |
| Di(2-ethyl hexyl) sebacate + 5% Bromoform | 1 | 1½ | 0.33 | 66 | 11.7 | 18.6 | 3.1 | 4.2 |
|  | 4 | 4½ | 1.16 | 66 | 11.7 | 77.7 | 3.1 | 12.2 |
| Di(2-ethyl hexyl) sebacate + 5% Bromobenzene. | 1 | 1½ | 0.33 | 67 | 11.2 | 18.7 | 3.1 | 4.2 |
|  | 4 | 4½ | 1.16 | 67 | 11.2 | 71.5 | 3.1 | 11.5 |
| Di(2-ethyl hexyl) sebate + 5% Dichlorobiphenyl. | 1 | 1½ | 0.33 | 66 | 13.2 | 28.7 | 3.4 | 5.7 |
|  | 4 | 4½ | 1.14 | 66 | 13.2 | 328 | 3.4 | 37.7 |
| Di(2-ethyl hexyl) sebacate + 5% 4-Fluoroanisole. | 1 | 1½ | 0.34 | 68 | 10.5 | 19.5 | 2.9 | 4.4 |
|  | 4 | 5 | 1.19 | 69 | 10.5 | 123.5 | 2.9 | 16.1 |
| Di(2-ethyl hexyl) sebacate + 5% Didodecyl selenide + 2% Iodobenzene. | 1 | 1½ | 0.33 | 59 | 11.9 | 17.0 | 3.3 | 4.1 |
|  | 4 | 6 | 1.51 | 109 | 11.9 | 427 | 3.3 | 41.0 |
| Di(2-ethyl hexyl) sebcate + 5% Didocecyl selenide + Sat'd w./Quinizarin. | 1 | 1½ | 0.34 | 60 | 12.5 | 15.7 | 3.2 | 3.8 |
|  | 4 | 6½ | 1.57 | 110 | 12.5 | 380.5 | 3.4 | 36.8 |
| + 2% Iodobenzene | d 1 | 1½ | 0.35 | 61 | 12.7 | 17.7 | 3.4 | 4.1 |
|  | d 4 | 6½ | 1.61 | 116 | 12.5 | 718.5 | 3.4 | 62.6 |
| Di(2-ethyl hexyl) sebacate + 5% Didodecyl selenide + Sat'd w./Quinizarin + 20% 1-Methylnaphthalene + 2% Iodobenzene. | 1 | 1½ | 0.34 | 60 | 8.4 | 11.0 | 2.5 | 2.9 |
|  | 4 | 6½ | 1.59 | 112 | 9.0 | 123 | 3.5 | 14.6 |
|  | 4 | 7 | 1.80 | 140 | 8.5 | 58.8 | 2.5 | 9.0 |
|  | 4 | 7 | 1.73 | 180 | 8.5 | 498 | 2.5 | 42.9 |
|  | 4 | 7 | 1.79 | 220 | 8.5 | coked | 2.5 | coked |
| Diethyl Adipate | 4 | 5½ | 1.43 | 68 | 2.4 | 20.3 | 1.0 | 4.2 |
| Diethyl Adipate + 5% Didodecyl selenide | 4 | 5½ | 1.43 | 69 | 2.4 | 10.5 | 1.0 | 2.8 |
| Diethyl Adipate + 5% Didodecyl selenide + 5% Iodobenzene. | 1 | 1½ | 0.36 | 69 | 2.4 | 3.6 | 1.0 | 1.3 |
|  | 4 | 5½ | 1.43 | 68 | 2.4 | 8.7 | 1.0 | 2.3 |
| Polyethers: |  |  |  |  |  |  |  |  |
| Poly (propene oxide) | 1 | ½ | 0.13 | 42 | 57.3 | 80.4 | 9.4 | 11.7 |
|  | 1 | 1½ | 0.36 | 73 | 57.3 | 99.2 | 9.6 | 13.0 |
|  | 1 | 1½ | 0.37 | 73 | 57.3 | 95.0 | 9.6 | 12.7 |
|  | 1 | 1½ | 0.37 | 73 | 57.3 | 99.5 | 9.6 | 13.1 |
|  | 4 | 1½ | 0.41 | 42 | 57.3 | 114.0 | 9.5 | 13.8 |
|  | 1 | 2 | 0.45 | 20 | 57.3 | 139.0 | 9.5 | 16.6 |
|  | 1 | 2 | 0.46 | 134 | 57.3 | 64.8 | 9.6 | 9.2 |
|  | 2 | 4 | 0.94 | 134 | 57.3 | 72.0 | 9.6 | 9.2 |
|  | 3 | 5½ | 1.40 | 134 | 57.3 | 139.0 | 9.6 | 13.5 |
|  | 4 | 6½ | 1.60 | 73 | 57.3 | 196 | 9.6 | 22.5 |
|  | 4 | 6½ | 1.60 | 74 | 57.3 | 232 | 9.6 | 18.7 |
|  | 4 | 6½ | 1.60 | 73 | 57.3 | 438 | 9.6 | 30.1 |
|  | 4 | 7 | 1.70 | 20 | 57.3 | 435 | 9.6 | 27.5 |
|  | 4 | 7 | 1.80 | 134 | 57.3 | 188.0 | 9.6 | 15.3 |
|  | 5 | 8½ | 2.10 | 131 | 57.3 | 334 | 9.6 | 21.3 |
|  | 6 | 10 | 2.50 | 131 | 57.3 | 1215 | 9.6 | 49.9 |
|  | 26 | 33½ | 8.39 | 136 | 57.3 | solid | 9.6 | solid |
| Poly (propene oxide) + 2% Iodobenzene | 1 | 1½ | 0.37 | 75 | 48.8 | 71.6 | 8.7 | 10.6 |
|  | 4 | 6½ | 1.60 | 76 | 48.8 | 118.0 | 8.7 | 13.6 |
| Poly (propene oxide) + 2% N-N'-diphenyl-p-phenylenediamine. | 1 | 2 | 0.44 | 80 | 60.0 | 124 | 10.3 | 15.3 |
| Poly (propene oxide) + Sat'd with N-N'-diphenyl-p-phenylene-diamine. | 4 | 4½ | 1.14 | 80 | 59.9 | 410 | 10.3 | 36.9 |
| Poly (propene oxide) + 2% N-phenyl-4-hydroxyphenylamine. | 1 | 1½ | 0.41 | 61 | 61.4 | 134.0 | 9.9 | 17.2 |
|  | 4 | 6½ | 1.60 | 61 | 61.4 | solid | 9.9 | solid |
|  | 2 | 2 | 0.54 | 66 | 65.6 | 173.0 | 10.2 | 103 |
|  | 5 | 7 | 1.78 | 61 | 65.6 | solid | 10.2 | solid |
| Poly (propene oxide) [High polymer] | 1 | 1½ | 0.41 | 70 | 84.0 | 174.0 | 13.9 | 20.0 |
|  | 4 | 6½ | 1.60 | 70 | 84.0 | 315 | 14.0 | 23.0 |
| Poly (propene oxide) [High polymer] + 2% phenyl-α-naphthylamine. | 1 | 1½ | 0.41 | 70 | 96.6 | 111.1 | 14.2 | 26.2 |
|  | 4 | 6½ | 1.60 | 70 | 96.6 | solid | 14.2 | solid |
| Poly (propene oxide) [Low polymer] | 4 | 6½ | 1.60 | 74 | 12.9 | 42.1 | 3.3 | 5.9 |
|  | 1 | 1½ | 0.34 | 68 | 20.7 | 29.7 | 4.6 | 5.7 |
| Poly (propene oxide) [Low polymer] + 2% phenyl-α-naphthylamine. | 4 | 5½ | 1.39 | 66 | 20.7 | 75.9 | 4.5 | 10.0 |
|  | 2 | 3½ | 0.89 | 73 | 37.6 | 205 | 6.9 | 19.5 |
|  | 2 | 3½ | 0.90 | 73 | 37.6 | 135.0 | 7.0 | 17.7 |
| Poly (propene oxide) [Low polymer] + Sat'd with N-N'-diphenyl-p-phenylene-diamine. | 1 | 1½ | 0.34 | 67 | 21.4 | 26.6 | 4.7 | 5.2 |
|  | 4 | 5½ | 1.37 | 66 | 21.4 | 70.2 | 4.7 | 9.7 |
| Poly (propene oxide) [Low polymer] + 2% phenyl-α-naphthylamine + 2% iodobenzene. | 1 | 1½ | 0.40 | 74 | 20.1 | 21.6 | 4.5 | 4.6 |
|  | 4 | 6 | 1.50 | 103 | 20.0 | 59.2 | 4.6 | 7.5 |
| Poly (propene oxide) [Low polymer] + 1% N-N'-diphenyl-p-phenylenediamine + 2% iodobenzene. | 1 | 1½ | 0.35 | 62 | 19.6 | 20.8 | 4.1 | 4.3 |
|  | 4 | 6½ | 1.63 | 118 | 19.6 | 87.0 | 4.1 | 9.5 |
| Poly (propene oxide) [Low polymer] + 5% Didodecyl selenide + Sat'd with Quinizarin + 2% Iodobenzene. | 1 | 1½ | 0.39 | 72 | 18.0 | 17.8 | 4.3 | 3.8 |
|  | 4 | 7 | 1.80 | 140 | 17.2 | 41.7 | 4.3 | 6.3 |
|  | 4 | 6½ | 1.68 | 120 | 18.0 | 57.4 | 4.4 | 7.6 |
|  | 4 | 7 | 1.73 | 180 | 17.8 | 410 | 4.2 | 30.7 |
|  | 4 | 7 | 1.79 | 220 | 17.8 | solid | 8.1 | solid |
| Dimethoxytetraglycol | 1 | 1½ | 0.36 | 67 | 2.5 | 4.0 | 1.0 | 1.3 |
|  | 4 | 5½ | 1.43 | 67 | 2.5 | 19.3 | 1.0 | boils |
| Dimethoxytetraglycol + 3% Didodecyl selenide. | 4 | 5½ | 1.38 | 67 | 2.6 | 9.3 | 1.1 | 2.5 |
| Dimethoxytetraglycol + 3% Didodecyl selenide + 5% Iodobenzene. | 1 | 1½ | 0.36 | 66 | 2.5 | 3.5 | 1.0 | 1.3 |
|  | 4 | 5½ | 1.41 | 67 | 2.5 | 8.0 | 1.0 | 2.2 |
| Dimethoxytetraglycol + 3% Didodecyl selenide + 5% Iodonaphthalene. | 1 | 1½ | 0.36 | 67 | 2.7 | 4.0 | 1.1 | 1.3 |
|  | 4 | 5½ | 1.41 | 67 | 2.7 | 8.6 | 1.1 | 2.4 |

See footnotes at end of table.

TABLE II—Continued

| Identity—Additive | Θ₁[a] (Weeks) | Θ₂[b] (hrs.) | Neutron[c] Dosage ×10⁻¹⁸ (n/cm.²) | Temp. (ave.) (°C.) | Viscosity (centistokes) at 100° F. Orig. | at 100° F. Irrad. | at 210° F. Orig. | at 210° F. Irrad. |
|---|---|---|---|---|---|---|---|---|
| Hydrocarbons: | | | | | | | | |
| Naphthenic Highly-Refined Western (U.S.) Petroleum Distillate. | 1 | 1½ | 0.34 | 65 | 2.9 | 4.3 | 1.1 | 1.4 |
|  | 4 | 5½ | 1.36 | 65 | 2.9 | 24.8 | 1.1 | 4.1 |
| Naphthenic Highly-Refined Western (U.S.) Petroleum Distillate + 5% Didodecyl selenide. | 1 | 1½ | 0.34 | 65 | 3.1 | 4.3 | 1.2 | 1.5 |
|  | 4 | 5½ | 1.36 | 65 | 3.1 | 23.5 | 1.2 | 4.2 |
| Naphthenic Highly-Refined Western (U.S.) Petroleum Distillate + 5% Didodecyl selenide + 5% Iodobenzene. | 1 | 1½ | 0.35 | 66 | 2.9 | 4.0 | 0.6 | 0.8 |
|  | 4 | 5½ | 1.38 | 66 | 2.9 | 8.2 | 1.1 | 2.2 |
| Naphthenic Highly-Refined Western (U.S.) Petroleum Distillate + 5% Didodecylselenide + 5% Iodonaphthalene. | 1 | 1½ | 0.35 | 65 | 3.0 | 3.4 | 1.2 | 1.3 |
|  | 4 | 5 | 1.24 | 73 | 3.0 | 7.3 | 1.2 | 1.8 |
| Paraffinic Solvent Refined Western (U.S.) Lubricating Oil (150-N). | 1 | 1½ | 0.42 | 61 | 31.9 | 68.9 | 5.1 | 8.0 |
|  | 4 | 6½ | 1.60 | 61 | 31.9 | ------ | 5.1 | ------ |
| Paraffinic Solvent Refined Western (U.S.) Lubricating Oil (150-N) + 20% 1-methylnaphthalene. | 1 | 1½ | 0.36 | 64 | 13.0 | 22.4 | 3.0 | 4.1 |
|  | 1 | 2 | 0.44 | 66 | 13.0 | 34.4 | 3.0 | 4.2 |
|  | 4 | 7 | 1.70 | 66 | 13.0 | 286 | 3.0 | 19.1 |
|  | 4 | 6½ | 1.66 | 120 | 13.0 | 930 | 3.0 | 41.9 |
| Paraffinic Solvent Refined Western (U.S.) Lubricating Oil (150-N) + 20% 1-methylnaphthalene + 2% Iodobenzene. | 1 | 1½ | 0.37 | 120 | 13.2 | 19.1 | 3.0 | 3.8 |
|  | 4 | 6½ | 1.66 | 120 | 13.2 | 834 | 3.0 | 45.5 |
| Paraffinic Solvent Refined Western (U.S.) Lubricating Oil (150-N) + 20% 1-methylnaphthalene + 5% Didodecyl selenide + 2% Iodobenzene. | 1 | 1½ | 0.39 | 120 | 12.5 | 18.4 | 3.0 | 3.7 |
|  | 4 | 6½ | 1.66 | 120 | 12.5 | sediment | 3.0 | sediment |
| Paraffinic Solvent Refined Western- (U.S.) Lubricating Oil (150-N) + 20% 1-methylnaphthalene + 5% Didodecyl selenide. | 1 | 1½ | 0.39 | 120 | 12.4 | 18.7 | 2.9 | 3.7 |
|  | 4 | 6½ | 1.68 | 120 | 12.4 | 378 | 2.9 | 24.3 |
| + Sat'd with Quinizarin + 2% Iodobenzene. | d 1 | 1½ | 0.39 | 120 | 12.5 | 19.9 | 3.0 | 3.9 |
|  | d 4 | 6½ | 1.68 | 120 | 12.5 | 379 | 3.0 | 23.8 |
| Paraffinic Solvent Refined Western (U.S.) Lubricating Oil (150-N) + 20% 1-methylnaphthalene + 5% Didodecyl selenide + Sat'd with Quinizarin + 8% Iodobenzene. | 1 | 1½ | 0.33 | 67 | 13.0 | 18.4 | 3.0 | 3.7 |
|  | 4 | 5½ | 1.35 | 65 | 13.0 | 50.3 | 3.0 | 6.8 |
| Paraffinic Solvent Refined Western (U.S.) Lubricating Oil (150-N) + 20% 1-methylnaphthalene + Sat'd with Alizarin. | 1 | 1½ | 0.39 | 76 | 13.4 | 20.9 | 3.1 | 4.0 |
|  | 4 | 6 | 1.56 | 74 | 13.4 | 132 | 3.1 | 12.9 |
|  | d 1 | 1½ | 0.39 | 75 | 13.4 | 21.6 | 3.1 | 4.1 |
|  | d 4 | 6 | 1.56 | 73 | 13.4 | 138 | 3.1 | 12.6 |
| Alkylbenzene: (M.W.=250) | e 1 | 1½ | 0.35 | 66 | 6.3 | 8.3 | 1.7 | 2.1 |
|  | 1 | 1½ | 0.38 | 77 | 6.1 | 8.0 | 1.7 | 2.0 |
|  | 1 | 1½ | 0.41 | 60 | 6.1 | 9.1 | 1.7 | 2.1 |
|  | 1 | 5½ | 1.36 | 66 | 6.3 | 21.3 | 1.7 | 3.4 |
|  | 4 | 6½ | 1.60 | 60 | 6.1 | 25.9 | 1.7 | 3.9 |
|  | 4 | 7 | 1.70 | 78 | 6.1 | 27.2 | 1.7 | 4.0 |
|  | 4 | 7 | 1.80 | 140 | 6.3 | 34.5 | 1.7 | 4.7 |
|  | 4 | 7 | 1.73 | 180 | 6.4 | 92.0 | 1.8 | 7.7 |
|  | 4 | 7 | 1.79 | 220 | 6.4 | empty | 1.8 | empty |
| Alkybenzene (M.W.=250) + Sat'd with Iodine. | 1 | 1½ | 0.42 | 120 | 6.2 | 7.2 | 1.7 | 1.9 |
|  | 4 | 7½ | 1.90 | 72 | 6.2 | 16.4 | 1.7 | 3.1 |
| Alkylbenzene (M.W.=250) + 1.6% Iodobenzene. | 1 | 1½ | 0.38 | 78 | 6.0 | 7.4 | 1.7 | 1.9 |
|  | 4 | 6 | 1.46 | 66 | 6.1 | 21.5 | 1.7 | 3.5 |
| Alkylbenzene (M.W.=250) + 5% Didodecyl selenide. | 4 | 5½ | 1.38 | 66 | 6.5 | 20.7 | 1.8 | 3.5 |
| Alkylbenzene (M.W.=250) + 5% Didodecyl selenide + 5% Iodobenzene. | 1 | 1½ | 0.35 | 67 | 5.8 | 7.1 | 1.7 | 1.9 |
|  | 4 | 5½ | 1.38 | 66 | 5.8 | 13.0 | 1.6 | 2.6 |
| Alkylbenzene (M.W.=250) + 5% Didodecyl selenide + 5% Iodonaphthalene. | 1 | 1½ | 0.35 | 66 | 6.3 | 7.1 | 1.7 | 1.9 |
|  | 4 | 5½ | 1.41 | 66 | 6.2 | 13.8 | 1.7 | 2.8 |
| Octadecylbenzene | d 1 | 1½ | 0.39 | 76 | 11.0 | 15.5 | 2.8 | 3.6 |
|  | d 4 | 6 | 1.46 | 129 | 11.0 | 127 | 2.8 | 11.8 |
|  | 26 | 39 | 9.68 | 70 | 11.0 | solid | 2.8 | solid |
| Octadecylbenzene +2% Iodobenzene. | 1 | 1½ | 0.33 | 67 | 10.6 | 13.8 | 2.7 | 3.2 |
|  | 1 | 1½ | 0.39 | 74 | 10.3 | 13.7 | 2.7 | 3.3 |
|  | 4 | 5½ | 1.37 | 66 | 10.6 | 24.4 | 2.7 | 4.7 |
|  | 4 | 5½ | 1.43 | 66 | 10.3 | 29.9 | 2.7 | 5.6 |
| Octadecylbenzene +8% Iodobenzene. | 4 | 6½ | 1.66 | 122 | 9.2 | 37.8 | 2.5 | 6.3 |
| Octadecylbenzene +5% Didodecyl selenide. | 1 | 1½ | 0.38 | 73 | 10.6 | 14.1 | 2.8 | 3.4 |
|  | 1 | 6 | 1.54 | 73 | 10.6 | 42.5 | 2.8 | 7.2 |
|  | 4 | 7 | 1.80 | 140 | 10.4 | 33.4 | 2.7 | 6.0 |
| Octadecylbenzene +5% Didodecyl selenide +Sat'd with Quinizarin +2% Iodobenzene. | 4 | 7 | 1.73 | 180 | 9.8 | 56.0 | 2.6 | 8.0 |
|  | 4 | 7 | 1.79 | 220 | 9.8 | coked | 2.6 | coked |
| Octadecylbenzene +5% Didodecyl selenide +Sat'd with Quinizarin +2% Iodonaphthalene. | 4 | 7 | 1.79 | 220 | 10.7 | 131 | 2.8 | 13.9 |

[a] Actual time irradiated.
[b] Approximated duration for same dosage if disposed in a reactor suitable for aircraft propulsion, having radiation flux densities of about two orders of magnitude greater—e.g., ca. 7×10¹³ neutrons/cm.²/sec.
[c] Approximated total cumulative neutron dosage sustained.
[d] Plus iron and copper wires to simulate exposure to metals of construction.
[e] By-product high-molecular-weight bottoms from commercial detergent alkylbenzene manufacture; technical mixture of straight-, and branched-chain-, aliphatic substituted benzenes of average molecular weight approximating 250.

The results presented in Table II clearly demonstrate the definite and substantial inhibition of irradiation-thickening afforded in each case by the incorporation of only a small amount of halogen or organic halogen compounds. Also apparent is the indication of eminent effectiveness of 8% additive, and the practical approach to such effectiveness afforded by so little as 2% to 5% halogen-agent.

In the section directed to esters, the increase in efficacy in proceeding down the halogen series from the fluorine agents to the iodine agents may be seen. Also, discernible, though, is a relative weakness of dichlorobiphenyl, despite its molecules' including two halogen atoms. Particularly noteworthy is the demonstration of substantial effectiveness of so little as 2% of the added organic halogen compound in mitigating the increase in irradiation-thickening susceptibility incurred by the polymerized propene-oxide oil as the result of inclusion of conventional organic amine additives—particularly the naphthylamine, and the phenylenediamine—therein.

Of the various fluids studied in Example I, a limited number of samples of the most promising types of organic-halogen-compound-inhibited oils, also compounded with other additives, demonstrate their irradiation-damage resistance in actual service as bearing lubricants under reactor irradiation in Examples II and III following.

EXAMPLE II

Six identical units of apparatus were fabricated, each essentially comprising an electric-motor-driven vertical bronze shaft, the major portion of which was rotatably disposed, as a journal, in a vertical steel split-bushing bearing, all adapted to operate submerged in a bath of selected lubricant. A bellows-actuated pair of "nut-cracker" jaws, adapted to apply lateral force tending to urge the separate halves of the split-bushing bearing together, was provided for adjustably imposing frictional loads upon the rotating journal. A simple gear box comprising four spur gears was provided between the electric motor and the shaft for reducing speed. The first three of these identical units were provided for insertion and operation within the same reactor as employed in Example I, while the remaining three were provided to serve as comparative references to be operated outside the reactor under precisely the same conditions, but in the absence of irradiation, as their respective counterpart units operated within the reactor. Types of organic fluids which were considered to show particular promise in Example I, containing small amounts of organic halogen compound, in accordance with the present invention, as well as amounts of other additives, as indicated, were assembled. Fifty milliliter portions of each of the three types of compounded oils were placed in a respective one of the first three, and of the second three, apparatus units, immersing the bearings, journals, and meshed spur gears. The first three apparatus units were inserted into the reactor at a location where a neutron flux of $8 \times 10^{11}$ neutrons per square centimeter per second had obtained in the absence of the units, whereupon the shaft journals were driven at a constant speed of 80 r.p.m. under varying loads, as indicated, and at an operating temperature of 140° C. maintained constant throughout operation of the units. The operation of each of the second three units outside the reactor paralleled exactly that of its respective counterpart within the reactor. While it was planned to run the three units for a ca. 100 hour period in the reactor, only one of the three units operated for the entire period; electric motor failures resulted in premature termination of the other two. During the operation, the reactor was shut down for one hour, and the electric motors were switched off for three short periods, all as indicated. Throughout the runs, the torque required to maintain the constant speed of 80 r.p.m., and the temperature, were continually measured. Ultimately, after a total of 132 hours in the reactor, the first three units were simultaneously removed from the reactor. Thereafter, the samples of oil were removed from all of the units, and their viscosities were separately determined at 100° F. to 210° F., and compared the measured viscosities of the original oil. Finally the apparatus units were dismantled, and the shafts, bushing halves, and spur gears and their shafts, were boiled in chloroform, brushed lightly with a metal brush to remove any deposits, and weighed; comparison of these final weights with the original weights of these parts revealed the extent of wear sustained. Details of operation, and quantitative results, are presented in Tables III, IV, and V below.

TABLE III

*Low Speed Bearing Tests—Conditions of Test (Units in Reactor)*

| Period of Test (hr.) | Jaw Load (lbs.) | Temp. (° C.) | Remarks |
|---|---|---|---|
| 0 through 3 | 0 | 120 | |
| Through 7.25 | 0 | 140 | |
| Through 17.5 | 1.88 | 140 | |
| Through 20.0 | 0 | 120 | Motors off. |
| Through 58.0 | 3.3 | 140 | |
| | | | Unit #3 Failed. |
| Through 68.0 | 0 | 120 | Motors off. |
| Through 70.5 | 3.3 | 140 | |
| Through 72.0 | 0 | 120 | Motors off. |
| Through 111.5 | 7 | 140 | |
| | | | Unit #1 Failed. |
| Through 119.0 | 7 | 140 | |
| | | | End of operation of units. |
| Through 132.0 | | | Units withdrawn from reactor. |

| Unit No. | Total Time Running (hrs.) | Total Time In Reactor (hrs.) | Total Neutron Dosage (neutrons/ cm.²×10¹⁸) |
|---|---|---|---|
| #1 | 97 | 132 | [1] 0.39 |
| #2 | 114.5 | 132 | 0.38 |
| #3 | 55.5 | 132 | 0.38 |

[1] Unit's position was in slightly greater neutron flux.

TABLE IV

*Low Speed Bearing Test—Irradiation-Damage Resistance of Halo-Organic Inhibited Oils in Service of Lubricating Low-Speed Bearing Under Reactor Irradiation*

| Unit No. | Oil | Viscosity (centistokes) | | | | | |
|---|---|---|---|---|---|---|---|
| | | at 100° F. | | | at 210° F. | | |
| | | Orig. | Ref. | Irrad. | Orig. | Ref. | Irrad. |
| 1 | Di(2-ethyl hexyl sebacate +5% didodecyl selenide +2% iodobenzene +20% 1-methylnaphththalene +Sat'd with Quinizarin | 8.5 | 13.0 | 32.8 | 2.5 | 3.5 | 6.5 |
| 2 | Poly(propene oxide) +5% didodecyl selenide +2% iodobenzene +Sat'd with Quinizarin | 17.7 | 20.5 | 31.0 | 4.3 | 4.8 | 6.1 |
| 3 | Octadecylbenzene +5% didodecyl selenide +6% iodobenzene +Sat'd with Quinizarin | 9.8 | 11.4 | 17.7 | 2.7 | 2.9 | 3.9 |

TABLE V

*Low Speed Bearing Tests—Wear and Torque Data*

| Unit No. | Weight Loss of Members (mg.) | | | Torque (gm.-cm.) | |
|---|---|---|---|---|---|
| | Shaft [1] | Shaft and Bearing [2] | All Parts [3] | Max. | Min. |
| 1 reactor | 45.6 | 55.7 | 68.5 | 1,600 | 550 |
| 1 reference | 6.4 | 4.7 | [4] −7.9 | 700 | 200 |
| 2 reactor | 29.8 | 37.1 | 21.9 | 1,800 | [5] 400 |
| 2 reference | 70.0 | 71.9 | 70.0 | [6] 1,000 | 400 |
| 3 reactor | 78.2 | 83.5 | 100.1 | 1,800 | 900 |
| 3 reference | 16.2 | 15.7 | 9.4 | 1,100 | 600 |

[1] Original weight: 7.7 gms.
[2] Original weight: 29.0 gms.
[3] Original weight: 54.3 gms.
[4] Increase is weight upon irradiation.
[5] Lower value predominant. After initial 40 hours excess, the torque in the case of the apparatus unit in the reactor decreased to and remained at ca. one-half the torque required in the out-of-reactor reference run.
[6] Higher value predominant. After initial 40 hours excess, the torque in the case of the apparatus unit in the reactor decreased to and remained at ca. one-half the torque required in the out-of-reactor reference run.

EXAMPLE III

Employing procedure paralleling that of Example II, the efficacy of fresh quantities of the same three compounded lubricants for lubricating high-speed ball-bearings under reactor irradiation was investigated. Again, a set of six identical apparatus units were fabricated; each unit consisted essentially of a horizontal air-driven turbine, adapted to operate at ca. 10,000 r.p.m., supported by a ball-bearing at each of the two extremities of its shaft. Each of the two turbine support bearings was disposed directly above an individual respective oil sump, and was lubricated from its respective sump by means of a large-diameter, slender, metal oil-ring, loosely encircling the shaft adjacent the bearing and depending into the bath of oil in the sump. The oil-ring turned on the rotating turbine shaft and thereupon continuously carried oil clinging thereto up to the ball bearings. Each of the units was made of 2S aluminum, except for the steel ball-bearings and a respective steel sleeve which supported each bearing on the turbine shaft. Again, the first three apparatus units were provided for operation within the same reactor as employed in the previous examples, while the remaining three units were provided for comparative reference runs outside the reactor. Fifteen milliliter proportions of fresh quantities of the same three compounded oils employed in Example II were placed in each of the two sumps of a respective one of the first three units, and of a respective one of the second three apparatus units. The first three units were inserted in the reactor to positions where neutron flux levels approximating $4.2 \times 10^{11}$ neutrons per square centimeter per second obtained in the absence of the units; the units were then operated at a turbine speed of 10,800 r.p.m. for 310 hours, and at a temperature maintained carefully at 140° C. The remaining three apparatus units were operated under conditions and durations exactly duplicating those to which their counterpart units within the reactor were subjected, except for the absence of reactor radiations. Including delay periods during which the units were within the reactor but not in operation, the total time that these units remained within the reactor amounted to 399 hours. Thereupon, the units within the reactor were withdrawn, and thereafter the samples of oil from all six units were individually removed from their respective sumps, and the viscosity of the same at both 100° F. and 210° F. was determined and compared with the viscosity of the original fresh oil. It was found that one of the pair of sumps in the unit, exposed to reactor irradiation, containing the compounded octadecylbenzene, was empty at the completion of the reactor test; there was no evidence of leakage from the sump, though there was present an unusually heavy deposit of sludge on and in the bearing, containing a high percentage of finely-divided aluminum which had been worn from the oil-ring. The presence of this large amount of finely-divided aluminum may have contributed to an accelerated deterioration of the lubricant, and may have mechanically fouled the bearing as well. Details and quantitative data obtained, are presented in Tables VI and VII below.

TABLE VI

*High Speed Bearing Tests—Conditions of Test (Units in Reactor)*

| Unit No. | Total Time (hrs.) | | Total Neutron Dosage (approx.) (neutrons/cm²×10¹⁸) |
|---|---|---|---|
| | Running | In Reactor | |
| 1 | 305 | 399 | 0.62 |
| 2 | 310 | 399 | 0.60 |
| 3 | 310 | 399 | 0.59 |

TABLE VII

*High Speed Bearing Tests—Irradiation Damage Resistance of Halo-Organic Inhibited Oils in Service of Lubricating High-Speed Ball-Bearings Under Reactor Irradiation*

| Unit No. | Oil | Viscosity (centistokes) | | | | | |
|---|---|---|---|---|---|---|---|
| | | at 100° F. | | | at 210° F. | | |
| | | Orig. | Ref. | Irrad. | Orig. | Ref. | Irrad. |
| 1 | Di(2-ethyl hexyl) sebacate + 5% didodecyl selenide + 2% iodobenzene + 20% 1-methylnaphthalene + Sat'd with Quinizarin. | 8.8<br>8.8 | 13.3<br>11.4 | 58.0<br>------ | 2.5<br>------ | 3.6<br>3.1 | 8.8<br>------ |
| 2 | Poly (propene oxide) + 5% didodecyl selenide + 2% iodobenzene + Sat'd with Quinizarin. | 17.7<br>17.7 | 19.5<br>19.6 | 40.3<br>33.9 | 4.3<br>------ | 4.6<br>4.6 | 6.4<br>5.8 |
| 3 | Octadecylbenzene + 5% didodecyl selenide + 6% iodobenzene + Sat'd with Quinizarin. | 9.8<br>9.8 | 11.6<br>11.3 | 34.3<br>------ | 2.7<br>------ | 2.8<br>2.8 | 5.9<br>------ |

As evidenced by the results in Tables III–VII, these selected lubricants, containing added organic halogen compound in accordance with the present invention, each remained fluid and continued to provide effective lubrication throughout the duration, and under the rather severe conditions, of these bearing operations. In the matter of the empty sump which occurred in Example III in the case of octadecylbenzene, this appears properly ascribable to spurious mechanical causes, rather than failure of the lubricant, since in the second sump of the same apparatus, the compounded octadecylbenzene was found intact, fluid, and to have evidently afforded operative lubrication service throughout the run. It is apparent also that in both the Example II and Example III results, it was the compounded, polymerized propene-oxide oil which suffered the least proportionate viscosity increase. Also particularly significant is the indication that the polymerized propene-oxide oil substantially improved as a lubricant under irradiation, in that both the wear imparted to the apparatus members and the torque required to maintain constant speed were, in the reactor operation, lower than in the comparative out-of-reactor reference tests; this, it may be seen, was not so in the case of the other two compounded oils investigated here.

Although this invention has been described with particular emphasis upon the currently important application to fluid organic hydrocarbons, hydrocarbon esters, and saturated polyethers, involved in nuclear power plant services, it is inherently of much wider applicability. In pursuits other than power generation, where such organic fluids are unprotectedly disposed in the proximity of neutronic reactors, the instant invention may likewise afford beneficial results. Moreover, aside from neutronic reactors, this procedure may be applied to inhibit damage from the same types of deleterious radiation, especially neutrons and gamma rays, emitted from other conventional radiation sources of same, such as radium-beryllium neutron sources, and nuclear reactions effected by means of Van de Graaff-generator-energized linear accelerators, and cyclotrons, and the like. Various additional applications of the hereinbefore-disclosed method will become apparent to those skilled in the art. It is therefore to be understood that all matters contained in the above description and examples are illustrative only and do not limit the scope of the present invention.

Cross-reference is made to companion co-pending applications of the common-assignee, directed to methods for similarly inhibiting and avoiding such reactor-irradiation damage to organic fluids, through employment of different agents:

S.N. 380,378, in the names of G. H. Denison, R. O. Bolt, J. W. Kent and F. A. Christiansen, filed September 15, 1953, for Method of Inhibiting Irradiation-Induced Viscosity Increase of Organic Fluids;

S.N. 380,144, in the names of G. H. Denison, R. O. Bolt, J. W. Kent, and F. A. Christiansen, filed September 8, 1953, for Method of Inhibiting Radiation Damage to Organic Fluids;

S.N. 380,146, in the names of G. H. Denison, R. O. Bolt, J. W. Kent and F. A. Christiansen, filed September 8, 1953, now abandoned, for Method of Inhibiting Irradiation-Induced Viscosity Increase of Organic Fluids; and S.N. 380,145, in the names of G. H. Denison, R. O. Bolt, J. W. Kent and F. A. Christiansen, filed September 8, 1953, now abandoned, for Method of Resisting Irradiation-Induced Viscosity Increase of Organic Fluids.

What is claimed is:

1. In a method for lubricating a system with an organic oil of lubricating viscosity, said system being subjected to nuclear irradiation, the improvement comprising lubricating said system with a paraffinic solvent refined lubricating oil (S.A.E. 30) having dissolved therein a minor proportion of iodonaphthalene.

2. The method of claim 1, wherein the minor proportion of iodonaphthalene is approximately 0.5–16%, by volume.

3. The method of stabilizing a lubricating oil against neutron irradiation damage which comprises dissolving a minor proportion of iodonaphthalene in said lubricating oil.

4. The method of claim 3, wherein the minor proportion of iodonaphthalene is approximately 0.5–16%, by volume.

References Cited in the file of this patent

UNITED STATES PATENTS

| | | |
|---|---|---|
| 1,963,917 | McLaren | June 19, 1934 |
| 1,986,645 | Prutton | Jan. 1, 1935 |
| 1,986,651 | Prutton | Jan. 1, 1935 |
| 2,308,622 | Lincoln et al. | Jan. 19, 1943 |
| 2,492,955 | Ballard et al. | Jan. 3, 1950 |
| 2,520,733 | Morris et al. | Aug. 29, 1950 |

OTHER REFERENCES

Daniels: U.S. Atomic Energy Commission MMDC–893, page 6, date declassified, April 7, 1947. Obtainable from Technical Information Branch, Oak Ridge, Tenn.